United States Patent Office 3,272,887
Patented Sept. 13, 1966

3,272,887
ISOMERIZATION OF OLEFINS USING SEPIOLITE CATALYST
Robert Chalmers Pitkethly, John Frederick Ford, and Arnold Fisher, all of Sunbury-on-Thames, Middlesex, England, assignors to The British Petroleum Company Limited, London, England, a British joint-stock corporation
No Drawing. Filed Oct. 15, 1963, Ser. No. 316,469
Claims priority, application Great Britain, Nov. 6, 1962, 41,931/62
8 Claims. (Cl. 260—683.2)

This invention relates to a process for effecting the isomerisation of an olefinic hydrocarbon by double bond migration.

According to the present invention there is provided a process for the isomerisation of an olefinic hydrocarbon which is capable of undergoing double bond shift, which process comprises isomerising the hydrocarbon in the presence of a silicate catalyst.

Preferably the silicate catalyst is employed in a state in which it is substantially free from deposited free metal. Preferably also the catalyst is free from sodium in a combined state and/or is free from potassium in a combined state.

Suitably there may be used a silicate catalyst obtained by treating a silicate, containing small amounts of combined sodium and/or combined potassium, for the removal of all or part of said sodium and/or potassium.

A preferred catalyst is sepiolite. Sepiolite is a commercially available clay mineral, which occurs naturally and which can also be prepared synthetically. It has the ideal formula $H_4Mg_9Si_{12}O_{30}(OH)_{10} \cdot 6H_2O$ and is also known as meerschaum. Further information on sepiolite and its properties may be found in "Chemistry and Industry" of November 16, 1957, at pages 1492 to 1495.

Sepiolite contains a small amount of alkali metals usually 1–2% by wt. which are present in combined form; preferably these alkali metals are removed by washing with mineral acid, strong organic acids, e.g. acetic acid; salts of these acids with nitrogen-containing bases, e.g. ammonia or with the free bases. Usually it will be necessary to heat the catalyst before use, for example, for the purpose of removing nitrogenous bases.

Preferably the silicate has a surface area greater than 100 sq. m./gm.

Preferably the hydrocarbon is in the vapour phase when contacted with the catalyst. Isomerisation may be carried out under mixed phase conditions, however, if so desired.

Preferably the hydrocarbon is contacted with the silicate at a temperature in the range 50°–500° C.

Preferably the hydrocarbon L.H.S.V. is in the range 0.1–10 vol./vol.

Preferably the hydrocarbon is contacted with the catalyst in the presence of an inert gaseous diluent. Nitrogen is a suitable diluent.

Preferably the ratio of hydrocarbon to diluent is in the rang 0.1:1 to 10:1.

Isomerisation in accordance with present invention may be carried out using as feedstock any hydrocarbon capable of double bond migration; if desired the feedstock may be a mixture comprising at least one such hydrocarbon. Clearly, when employing mixtures, the components will not be present in the equilibrium proportions corresponding to the isomerisation conditions. Depending on isomerisation conditions, double bond isomerisation may be effected without change of the carbon skeleton.

The olefinic hydrocarbon may be a mono-olefin, diene or polyene; however, the preferred feedstocks are mono-olefins. Preferably the olefin contains less than 20 carbon atoms/molecule. Most preferably the hydrocarbon contains 4–6 carbon atoms per molecule.

The process of this invention is particularly suitable for conversion to 2-methylpentene-2 of 4-methylpentene-1, 4-methylpentene-2 and/or 2-methylpentene-1; also, the conversion to 2-methylbutene-2 of 2-methylbutene-1 and/or 3-methylbutene-1; also for the conversion to cis- and trans-pentene-2 of pentene-1.

The pressure employed may be sub-atmospheric, atmospheric or super atmospheric.

The invention is illustrated but not limited with reference to the following examples.

EXAMPLE 1

Using a micro-reactor, 4-methylpentene-1 was passed in vapour phase over a 1 ml. bed of powdered sepiolite at a liquid hourly space velocity of 1.0 and at atmospheric pressure. In four separate runs the temperature was 150, 200, 300 and 400° C. Results obtained are shown in Table 1.

Table 1

| Composition of Product (percent weight) | | | | |
|---|---|---|---|---|
| Reaction Temperature | 150 | 200 | 300 | 440 |
| Unchanged Feed | 64 | 32 | 8 | 6 |
| cis- and trans-4-methylpentene-2 | 28 | 34 | 28 | 20 |
| 2-methylpentene-1 | 2 | 7 | 13 | 16 |
| 2-methylpentene-2 | 6 | 23 | 38 | 35 |
| cis- and trans-3-methylpentene-2 | Trace | 4 | 13 | 22 |
| 2:3-dimethylbutene-2 | 0 | 0 | 0 | 1 |

EXAMPLE 2

Using a micro-reactor, 4-methylpentene-1 was passed in vapour phase over a 1 ml. bed of powdered sepiolite at 190° C., at an L.H.S.V. of 2 and at atmospheric pressure.

Product analysis at three different times on stream are shown in Table 2.

Table 2

| Composition of Product (percent weight) | | | |
|---|---|---|---|
| Time on Stream (min.) | 42 | 197 | 3 17 |
| Unchanged feed | 60 | 61 | 64 |
| cis- and trans-4-methylpentene-2 | 31 | 31 | 30 |
| 2-methylpentene-1 | 2 | 2 | 2 |
| 2-methylpentene-2 | 7 | 6 | 4 |
| cis- and trans-3-methylpentene-2 | 0 | 0 | 0 |

EXAMPLE 3

10 ml. of powdered sepiolite was extracted with a 50% by vol. aqueous solution of acetic acid under reflux. The treated sepiolite was washed with distilled water, dried for 2 hours at 110° C. and for 2 hours at 350° C.

4-methylpentene-1 was passed over a 1 ml. bed of this catalyst at a liquid hourly space velocity of 2 and at atmospheric pressure and at a reaction temperature of 190° C.

Product analysis after 120 minutes on stream is shown in Table 3.

Table 3

Composition of product:   Percent by wt.
    Unchanged feed _____ 36
    Cis- and trans-4-methylpentene-2 _____ 40
    2-methylpentene-1 _____ 6
    2-methylpentene-2 _____ 15
    Cis- and trans-3-methylpentene-2 _____ 3

EXAMPLE 4

A fresh 10 ml. sample of sepiolite was treated with an approximately molar aqueous solution of ammonium acetate by percolation using 100 ml. of solution. The treated material was washed and exhaustively extracted with deionised water in a Soxhlet apparatus for 6 hours. It was then dried at 110° C. overnight in an oven and further dried at 350° C. for 1 hour in a nitrogen stream to remove ammonia.

The activity of a 1 ml. sample of this material for isomerising 4-methylpentene-1 at 190° C., at an L.H.S.V. of 2 and at atmospheric pressure was then measured.

Product analysis after 120 minutes on stream is shown in Table 4.

Table 4

| Composition of product: | Percent by wt. |
|---|---|
| Unchanged feed | 48 |
| 4-methylpentene-2 | 36 |
| 2-methylpentene-1 | 4 |
| 2-methylpentene-2 | 12 |
| 3-methylpentene-2 | 0 |

We claim:

1. A process for the isomerization of a mono-olefin having between 4 and 6 carbon atoms per molecule, which is capable of undergoing double bond shift, which process comprises isomerising the olefin in contact with a sepiolite catalyst at between 50° and 500° C.

2. A process according to claim 1 wherein the catalyst is substantially free from deposited free metal.

3. A process according to claim 1 wherein the catalyst is substantially free from sodium in the combined state and substantially free from potassium in the combined state.

4. A process according to claim 1 wherein the sepiolite has a surface area greater than 100 sq. m./gm.

5. A process according to claim 1 wherein the hydrocarbon is in the vapour phase when contacted with the catalyst.

6. A process according to claim 1 wherein the hydrocarbon L.H.S.V. is in the range 0.1–10 vol./vol.

7. A process according to claim 6 wherein the hydrocarbon is contacted with the catalyst in the presence of an inert gaseous diluent.

8. A process according to claim 7 wherein the ratio of hydrocarbon to diluent is in the range 0.1:1 to 10:1.

References Cited by the Examiner

UNITED STATES PATENTS

| | | | |
|---|---|---|---|
| 2,313,053 | 3/1943 | Simo et al. | 260—683.2 |
| 2,331,338 | 10/1943 | Michael et al. | 260—683.2 |
| 2,346,657 | 4/1944 | Bloch et al. | 260—683.2 |
| 2,357,741 | 9/1944 | Howes et al. | 260—683.2 |
| 2,390,556 | 12/1945 | Ruthruff | 252—450 |
| 2,431,481 | 11/1947 | Hurd et al. | 252—450 |

OTHER REFERENCES

Shuikin et al., Zhurnal Obshchei Khimii, vol. 27, page 1448, 1957.

DELBERT E. GANTZ, *Primary Examiner.*

R. H. SHUBERT, *Assistant Examiner.*